United States Patent
Kim et al.

(10) Patent No.: US 9,088,167 B2
(45) Date of Patent: Jul. 21, 2015

(54) WIRELESS POWER TRANSMISSION SYSTEM USING SOLAR CELL MODULE

(75) Inventors: Nam Yun Kim, Seoul (KR); Sang Wook Kwon, Seongnam-si (KR); Yun Kwon Park, Dongducheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 506 days.

(21) Appl. No.: 13/593,303

(22) Filed: Aug. 23, 2012

(65) Prior Publication Data

US 2013/0049475 A1 Feb. 28, 2013

(30) Foreign Application Priority Data

Aug. 31, 2011 (KR) ........................ 10-2011-0087696

(51) Int. Cl.
*H02J 5/00* (2006.01)
*H01F 38/00* (2006.01)

(52) U.S. Cl.
CPC ...................... *H02J 5/005* (2013.01)

(58) Field of Classification Search
USPC ........................................................ 307/104
See application file for complete search history.

(56) References Cited

U.S. PATENT DOCUMENTS

2010/0207572 A1  8/2010  Kirby et al.

FOREIGN PATENT DOCUMENTS

| JP | 2009-171792 A | 7/2009 |
| JP | 2010-246319 A | 10/2010 |
| KR | 10-0693042 B1 | 3/2007 |
| KR | 10-0750201 B1 | 8/2007 |
| KR | 10-2010-0097796 A | 9/2010 |
| KR | 10-2011-0037523 A | 4/2011 |

*Primary Examiner* — Robert Deberadinis
(74) *Attorney, Agent, or Firm* — NSIP Law

(57) ABSTRACT

A wireless power transmission system includes a charging and path controller configured to supply, to a battery module, power generated by a solar cell module, or power generated by an alternating current-to-direct current (AC/DC) converter, based on a control signal; a power converter configured to receive power from the battery module and generate a supply power to be supplied to a target device from power received from the battery module using a resonant frequency; a source resonator configured to receive the supply power from the power converter and transmit the supply power received from the power converter to the target device; and a control/communication unit configured to generate the control signal of the charging and path controller based on an amount of the power generated by the solar cell module and an amount of power that can be output from the battery module.

17 Claims, 11 Drawing Sheets

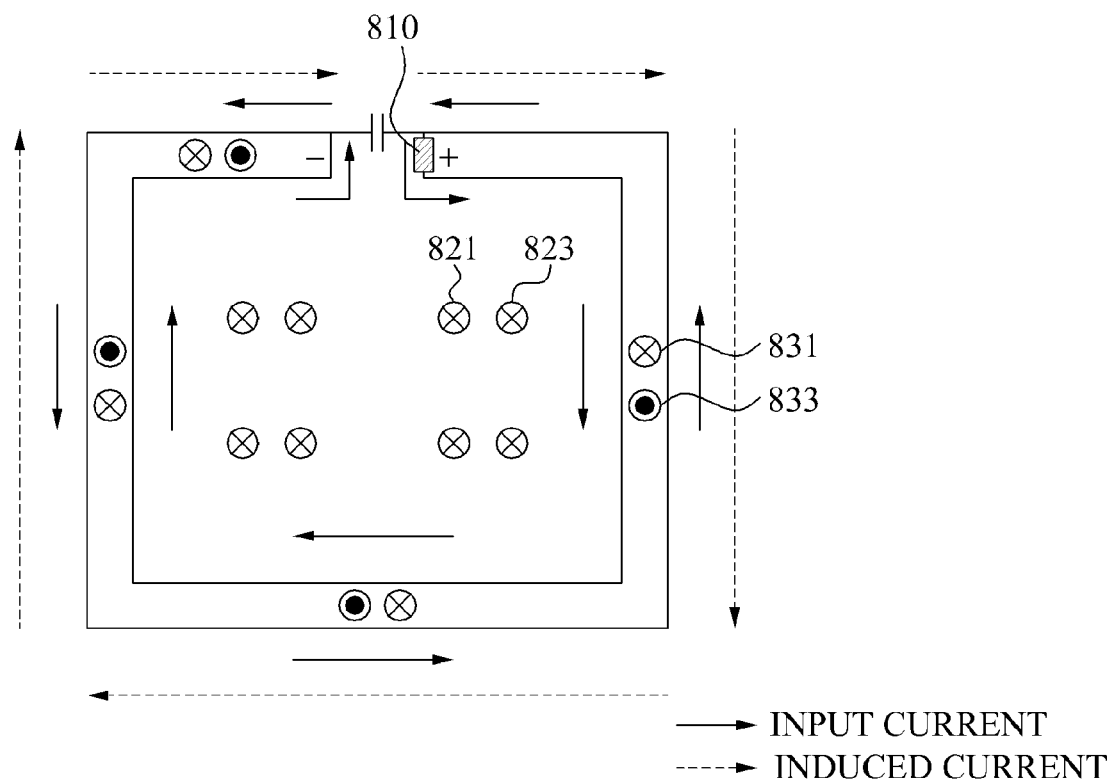

WIRELESS POWER TRANSMISSION SYSTEM USING SOLAR CELL MODULE

CROSS-REFERENCE TO RELATED APPLICATIONS

This application claims the benefit under 35 USC 119(a) of Korean Patent Application No. 10-2011-0087696 filed on Aug. 31, 2011, in the Korean Intellectual Property Office, the entire disclosure of which is incorporated herein by reference for all purposes.

BACKGROUND

1. Field

The following description relates to a wireless power transmission system using a solar cell module.

2. Description of Related Art

Wireless power refers to energy that is transferred from a wireless power transmitter to a wireless power receiver, for example, via magnetic coupling. A wireless power transmission system includes a source device and a target device. The source device wirelessly transmits power, and the target device wirelessly receives power. The source device may be referred to as a wireless power transmitter, and the target device may be referred to as a wireless power receiver.

The source device includes a source resonator, and the target device includes a target resonator. Magnetic coupling or resonance coupling couples the source resonator and the target resonator together.

A solar cell module generates electric energy using solar energy. The solar cell module may be used as an electric energy source for a device such as a clock, a calculator, a mobile communication base station, an artificial satellite, and any other device that requires electrical energy.

SUMMARY

In one general aspect, a wireless power transmitter includes a charging and path controller configured to supply, to a battery module, power generated by a solar cell module, or power generated by an alternating current-to-direct current (AC/DC) converter, based on a control signal; a power converter configured to receive power from the battery module and generate a supply power to be supplied to a target device from the power received from the battery module using a resonant frequency; a source resonator configured to receive the supply power from the power converter and transmit the supply power received from the power converter to the target device; and a control/communication unit configured to generate the control signal of the charging and path controller based on an amount of the power generated by the solar cell and an amount of power that can be output by the battery module.

The AC/DC converter may be configured to receive an AC voltage from an external power supply located outside the wireless power transmitter, convert the AC voltage received from the external power supply to a DC voltage, and output the DC voltage as the power generated by the AC/DC converter.

The power converter may include a switching pulse signal generator configured to generate a switching pulse signal having a same frequency as the resonant frequency; a power amplifier configured to switch a power control voltage supplied from the battery module based on the switching pulse signal to generate the supply power; and an impedance controller configured to adjust an impedance of the source resonator.

The control/communication unit may be further configured to generate the control signal to control the charging and path controller to supply the power generated by the AC/DC converter to the battery module when the amount of the power generated by the solar cell module is less than a predetermined value.

The control/communication unit may be further configured to generate the control signal to control the charging and path controller to supply the power generated by the solar cell module to the battery module when the amount of the power generated by the solar cell module is equal to or greater than a predetermined value.

The control/communication unit may be further configured to determine a dissipation power of the target device; and generate the control signal to control the charging and path controller to supply the power generated by the AC/DC converter to the battery module when the amount of the power generated by the solar cell module is less than the dissipation power.

The charging and path controller may be further configured to supply the power generated by the solar cell module or the power generated by the AC/DC converter to the battery module, or supply the power generated by the AC/DC converter to the power converter, based on the control signal; and the control/communication unit may be further configured to determine a dissipation power of the target device; and generate the control signal to control the charging and path controller to supply the power generated by the AC/DC converter to the power converter when the amount of the power that can be output by the battery module is less than the dissipation power.

In another general aspect, a wireless power transmission method using a solar cell module includes charging a battery module using power generated by a solar cell module; generating a supply to be supplied to a target device using power stored in the battery module by the charging; transmitting the supply power to the target device via a magnetic coupling; requesting state information of the target device; receiving the state information of the target device; and controlling an amount of the supply power based on the state information of the target device.

The state information of the target device may include information on a dissipation power of the target device, or information on a battery type of the target device, or information on a battery charging state of the target device, or any combination thereof.

The state information of the target device may include the information on the dissipation power of the target device; and the wireless power transmission method may further include receiving power supplied from an external power supply; and generating the supply power using the power received from the external device when the dissipation power is greater than an amount of power that can be output by the battery module.

The state information of the target device may include the information on the battery charging state of the target device; and the wireless power transmission method may further include determining a battery charging state of the target device based on the information on the battery charging state of the target device; and blocking a power transmission to the target device when the battery charging state of the target device indicates that a battery module of the target device is charged above a predetermined level.

The wireless power transmission method may further include determining an amount of energy remaining in the battery module; and blocking a power transmission to the target device when the amount of the energy remaining in the battery module is less than a predetermined value.

In another general aspect, a wireless power transmitter includes a solar cell module configured to output DC power; an alternating current-to-direct current (AC/DC) converter configured to output DC power; a battery module configured to receive DC power, store the DC power received by the battery module, and output the DC power stored by the battery module; a power converter configured to receive DC power, convert the DC power received by the power converter to AC power to be transmitted to a target device, and output the AC power; a source resonator configured to receive the AC power from the power converter and transmit the AC power received from the power converter to the target device; a charging and path controller configured to receive the DC power from the solar cell module and the DC power from the AC/DC converter, and based on a control signal, supply the DC power received from the solar cell module to the battery module, or supply the DC power received from the AC/DC converter to the battery module, or supply the DC power received from the AC/DC converter to the power converter; and a control/communication unit configured to generate the control signal of the charging and path controller based on an amount of the DC power output by the solar cell module, and an amount of DC power that can be output by the battery module.

The control/communication unit may be further configured to generate the control signal to control the charging and path controller to supply the DC power received from the AC/DC converter to the battery module when the amount of the DC power output by the solar cell module is less than a predetermined value.

The control/communication unit may be further configured to generate the control signal to control the charging and path controller to supply the DC power received from the solar cell module to the battery module when the amount of the DC power output by the solar cell module is equal to or greater than a predetermined value.

The control/communication unit may be further configured to generate the control signal to control the charging and path controller to supply the DC power received from the AC/DC converter to the battery module when the amount of the DC power output by the solar cell module is less than a dissipation power of the target device.

The charging and path controller may be further configured to generate the control signal to control the charging and path controller to supply the DC power received from the AC/DC converter to the power converter when the amount of the DC power that can be output by the battery module is less than a dissipation power of the target device.

Other features and aspects will be apparent from the following detailed description, the drawings, and the claims.

BRIEF DESCRIPTION OF THE DRAWINGS

FIG. 8A is a diagram illustrating an example of a distribution of a magnetic field inside a resonator produced by feeding of a feeding unit.

DETAILED DESCRIPTION

Figure 1:
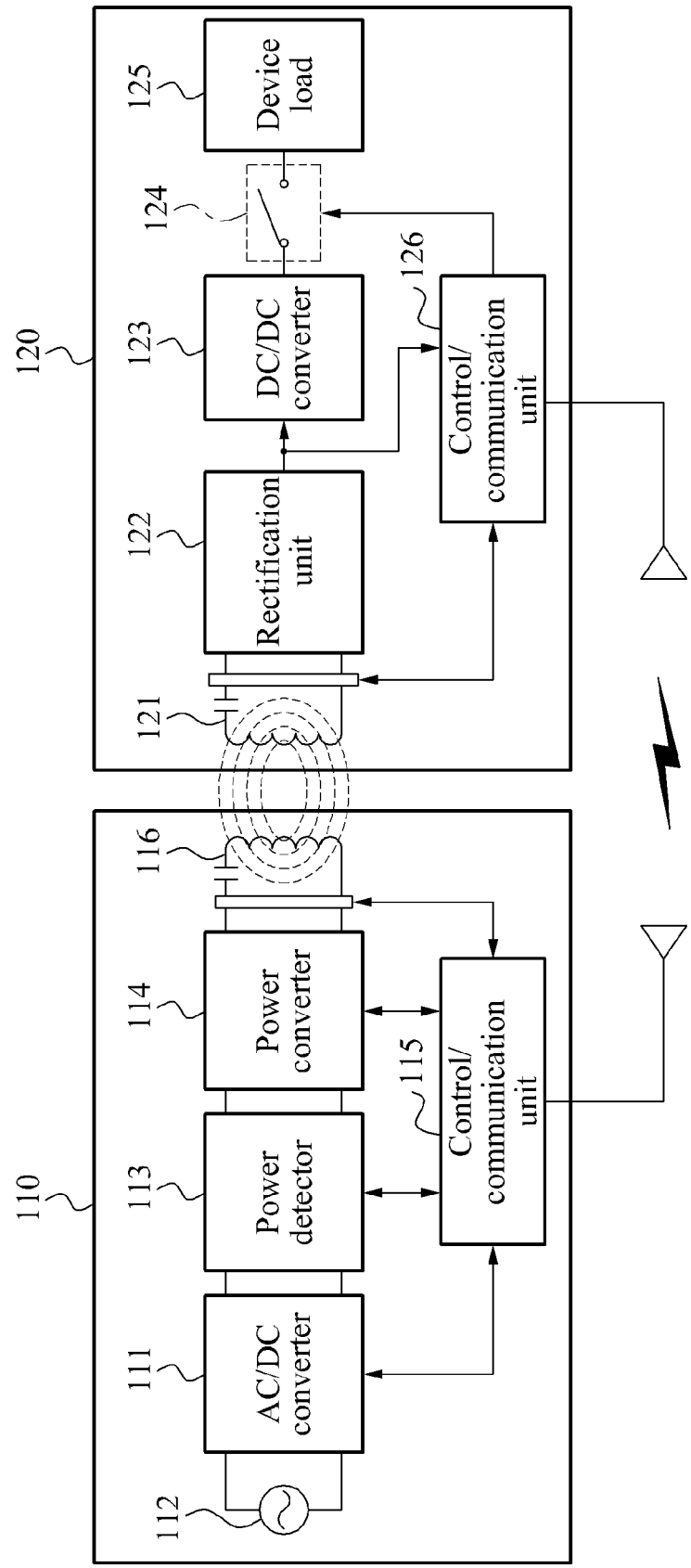
FIG. 1 is a diagram illustrating an example of a wireless power transmission system.

The following detailed description is provided to assist the reader in gaining a comprehensive understanding of the methods, apparatuses, and/or systems described herein. However, various changes, modifications, and equivalents of the systems, apparatuses, and/or methods described herein will be apparent to one of ordinary skill in the art. The sequences of operations described herein are merely examples, and the sequences of operations are not limited to those set forth herein, but may be changed as will be apparent to one of ordinary skill in the art, with the exception of operations necessarily occurring in a certain order. Also, description of functions and constructions that are well known to one of ordinary skill in the art may be omitted for increased clarity and conciseness.

Throughout the drawings and the detailed description, the same drawing reference numerals refer to the same elements. The drawings may not be to scale, and relative size, proportions, and depictions elements in the drawings may be exaggerated for clarity, illustration, and convenience.

FIG. 1 is a diagram illustrating an example of a wireless power transmission system. Referring to FIG. 1, the wireless power transmission system includes a source device 110 and a target device 120.

The source device 110 includes an alternating current-to-direct current (AC/DC) converter 111, a power detector 113, a power converter 114, a control/communication unit 115, and a source resonator 116.

The target device 120 includes a target resonator 121, a rectification unit 122, a DC-to-DC (DC/DC) converter 123, a switch unit 124, a device load 125, and a control/communication unit 126.

The AC/DC converter 111 generates a DC voltage by rectifying an AC voltage having a frequency of tens of hertz (Hz) output from a power supply 112. The AC/DC converter 111 may output DC voltage having a predetermined level, or output a DC voltage having an adjustable level that is controlled by the control/communication unit 115, or both.

The power detector 113 detects an output current and an output voltage of the AC/DC converter 111, and provides, to the control/communication unit 115, information on the detected current and the detected voltage. Additionally, the power detector 113 detects an input current and an input voltage of the power converter 114.

The power converter 114 generates a supply power by converting the DC voltage output from the AC/DC converter 111 to an AC voltage using a resonant frequency. The supply power may be power that is to be supplied to the target device 120. For example, the power converter 114 may generate a tracking power or an operation power using the DC voltage and a reference resonant frequency. The tracking power may be used by the target device 120 to track a resonant frequency, and the operation power may be used by the target device 120 to operate the target device 120. The power converter 114 may generate the operation power based on a power transmission efficiency and a dissipation power of the target device 120. The power converter 114 generates power by converting the DC voltage output from the AC/DC converter 111 to an AC voltage using a switching pulse signal having a frequency of tens of kilohertz (kHz) to tens of megahertz (MHz). The power converter 114 may convert the DC voltage to the AC voltage using a resonant frequency, and may generate a tracking power, a charging power, or an operation power. The tracking power, the charging power, or the operation power may be used in the target device 120. The tracking power may be a low power of 0.1 milliwatt (mW) to 1 mW. The charging power or the operation power may be a high power of 1 mW to 200 W.

In this description, the term "charging" may refer to supplying power to a unit or element that is configured to charge power. Additionally, the term "charging" may refer to supplying power to a unit or element that consumes power. For example, the term "charging power" may refer to power used to charge a battery of a target device, or power consumed by the target device while operating. Examples of the unit or element include, for example, batteries, displays, sound output circuits, main processors, and various sensors.

In this description, the term "reference resonant frequency" refers to a resonant frequency that is nominally used by the source device 110, and the term "tracking frequency" refers to a resonant frequency used by the source device 110 that has been adjusted based on a predetermined scheme.

The control/communication unit 115 may determine a resonant frequency at which a power transmission efficiency of wireless power transmission is equal to or greater than a predetermined value, and may perform power control so that an amount of power received by the target device 120 is maintained within a predetermined range.

The control/communication unit 115 may detect a reflected wave of the tracking power, the charging power, or the operation power, and may detect mismatching between the target resonator 121 and the source resonator 116 based on the detected reflected wave. To detect the mismatching, the control/communication unit 115 may detect an envelope of the reflected wave, or detect a power amount of the reflected wave, or both. The control/communication unit 115 may calculate a voltage standing wave ratio (VSWR) based on a voltage level of the reflected wave and a level of an output voltage of the source resonator 116 or the power converter 114. When the VSWR is less than a predetermined value, the control/communication unit 115 detects that there is mismatching between the target resonator 121 and the source resonator 116.

The source resonator 116 transfers electromagnetic energy, such as the tracking power, or the charging power, or the operation power, to the target resonator 121 via magnetic coupling with the target resonator 121.

The target resonator 121 receives the electromagnetic energy, such as the tracking power, or the charging power, or the operation power, from the source resonator 116 via the magnetic coupling with the source resonator 116. Additionally, the target resonator 121 may receive various messages from the source device 110 via in-band communication.

The rectification unit 122 generates a DC voltage by rectifying an AC voltage received from the target resonator 121.

The DC/DC converter 123 adjusts a level of the DC voltage output from the rectification unit 122 based on a voltage rating of the device load 125 and provides the DC voltage having the adjusted level to the device load 125. For example, the DC/DC converter 123 may adjust the level of the DC voltage output from the rectification unit 122 to a level in a range from 3 volts (V) to 10 V.

The switch unit 124 is turned on and off by the control/communication unit 126. When the switch unit 124 is turned off, the control/communication unit 115 of the source device 110 may detect a reflected wave. In other words, when the switch unit 124 is turned off, the magnetic coupling between the source resonator 116 and the target resonator 121 is interrupted.

The device load 125 may include a battery. The device load 125 may charge the battery using the DC voltage output from the DC/DC converter 123.

The control/communication unit 126 may transmit, to the source device 110, information on an amount of the received tracking power, a dissipation power of the device load 125, and an amount of the received operation power.

The control/communication unit 126 may detect information on a charging state of a rechargeable battery of the device load 125, and may transmit the information on the charging state to the source device 110. The information on the charging state may include, for example, an amount of current flowing to the rechargeable battery, a voltage applied to the rechargeable battery, and any other information on the charging state.

The control/communication unit 126 may perform in-band communication to transmit or receive data using a resonant frequency by demodulating a received signal obtained by detecting a signal between the target resonator 121 and the rectification unit 122, or by detecting an output signal of the rectification unit 122. In other words, the control/communication unit 126 may demodulate a message received via the in-band communication.

Additionally, the control/communication unit 126 may adjust an impedance of the target resonator 121 to modulate a signal to be transmitted to the source device 110. The control/communication unit 126 may modulate the signal to be transmitted to the source device 110 by turning on or off the switch unit 124. For example, the control/communication unit 126 may increase the impedance of the target resonator 121 by turning the switch unit 124 off so that a reflected wave will be detected from the control/communication unit 115 of the source device 110. Depending on whether the reflected wave is detected, the control/communication unit 115 will detect a binary number "0" or "1."

The control/communication unit 126 may receive a wake-up request message from the source device 110, detect an amount of power received by the target resonator 121, and transmit, to the source device 110, information on the amount of the power received by the target resonator 121. The information on the amount of the power received by the target resonator 121 may include, for example, an input voltage value and an input current value of the rectification unit 122, an output voltage value and an output current value of the rectification unit 122, an output voltage value and an output current value of the DC/DC converter 123, and any other information on the amount of the power received by the target resonator 121.

Figure 2:
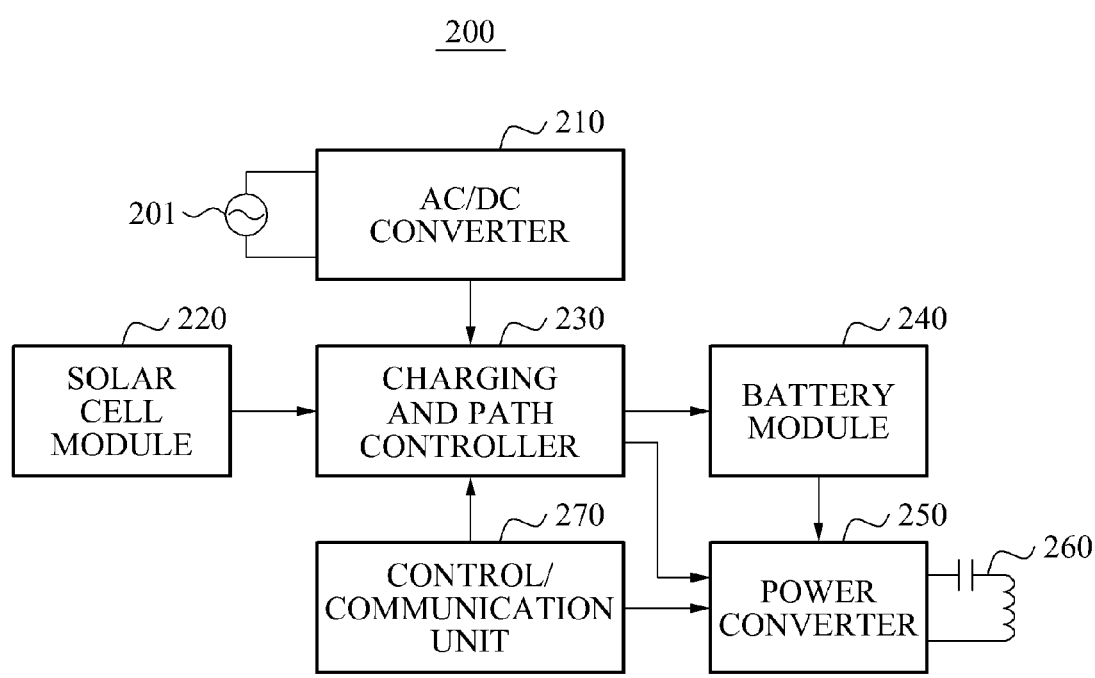
FIG. 2 is a diagram illustrating an example of a wireless power transmitter.

FIG. 2 is a diagram illustrating an example of a wireless power transmitter. Referring to FIG. 2, a wireless power transmitter 200, which is a source device, includes an AC/DC converter 210, a solar cell module 220, a charging and path controller 230, a battery module 240, a power converter 250, a source resonator 260, and a control/communication unit 270. The wireless power transmitter 200 further includes a power supply 201 to supply power to the AC/DC converter 210. The power supply 201 may be, for example, an external device located outside the wireless power transmitter 200.

The AC/DC converter 210 performs the same function as the AC/DC converter 111 of FIG. 1. The AC/DC converter 210 receives an AC voltage from the power supply 201, and converts the AC voltage received from the power supply 201 to a DC voltage.

The solar cell module 220 converts solar energy to electric energy, and stores the electric energy.

The charging and path controller 230 supplies power generated by the solar cell module 220 or power generated by the AC/DC converter 210 to the battery module 240, or supplies power generated by the AC/DC converter 210 to the power converter 250, based on a control signal generated by the control/communication unit 270. Thus, the charging and path controller 230 controls power paths to the battery module 240 and the power converter 250.

The battery module 240 is charged by the power generated by the solar cell module 220, or the power generated by the AC/DC converter 210, depending on the control signal of the charging and path controller 230.

The power converter 250 performs the same function as the power converter 114 of FIG. 1. The power converter 250 generates a supply power from power supplied from the battery module 240 using a resonant frequency. The supply power is a power that is to be supplied to a target device as described above.

The source resonator 260 performs the same function as the source resonator 116 of FIG. 1. The source resonator 260 transmits, to the target device, the supply power generated by the power converter 250.

The control/communication unit 270 performs the same function as the control/communication unit 115 of FIG. 1, and also generates the control signal of the charging and path controller 230 based on an amount of the power generated by the solar cell module 220 and an amount of power that can be output by the battery module 240.

When the amount of the power generated by the solar cell module 220 is less than a predetermined value, the control/communication unit 270 generates the control signal to control the charging and path controller 230 to supply the power generated by the AC/DC converter 210 to the battery module 240.

When the amount of the power generated by the solar cell module 220 is equal to or greater than the predetermined value, the control/communication unit 270 generates the control signal to control the charging and path controller 230 to supply the power generated by the solar cell module 220 to the battery module 240.

The control/communication unit 270 determines a dissipation power of the target device. When the amount of the power generated by the solar cell module 220 is less than the dissipation power, the control/communication unit 270 generates the control signal to control the charging and path controller 230 to supply the power generated by the AC/DC converter 210 to the battery module 240.

When the amount of power that can be output by the battery module 240 is less than the dissipation power, the control/communication unit 270 generates the control signal to control the charging and path controller 230 to supply the power generated by the AC/DC converter 210 to the power converter 250.

Figure 3:
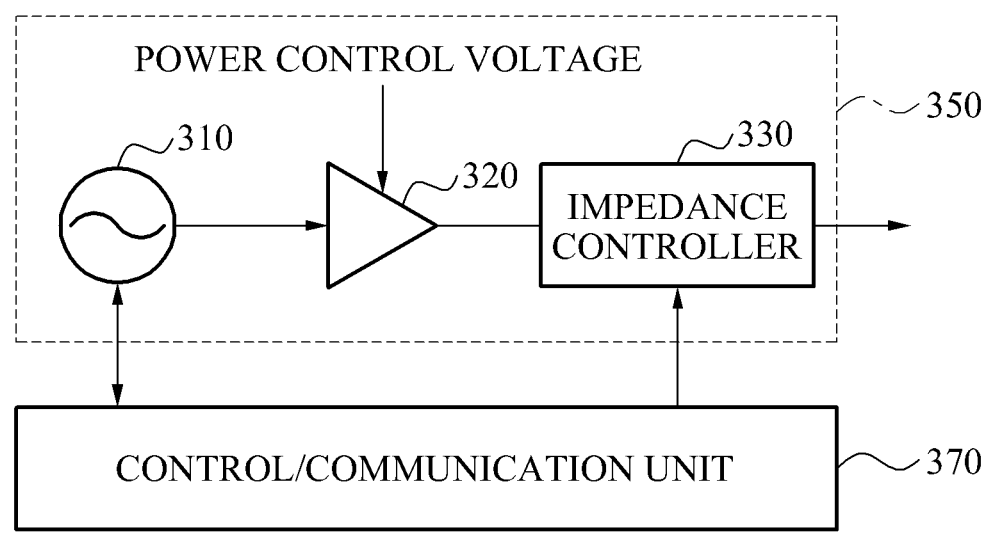
FIG. 3 is a diagram illustrating an example of a power converter.

FIG. 3 is a diagram illustrating an example of a power converter. Referring to FIG. 3, a power converter 350 includes a switching pulse signal generator 310, a power amplifier 320, and an impedance controller 330. The power converter 350 performs the same function as the power converter 114 of FIG. 1 and the power converter 250 of FIG. 2. FIG. 3 also shows a control/communication unit 370 that performs the same function as the control/communication unit 115 of FIG. 1 and the control/communication unit 270 of FIG. 2, and also generates control signals for controlling the switching pulse signal generator 310 and the impedance controller 330.

The switching pulse signal generator 310 generates a switching pulse signal having the same frequency as a resonant frequency of a source resonator. The switching pulse signal generator 310 generates a switching pulse signal having a frequency of a few kHz to tens of MHz. The frequency of the switching pulse signal is determined by the control signal generated by the control/communication unit 370. For example, when a reference resonant frequency $F_{Ref}$ of a source resonator is set to 13.56 MHz or 6.78 MHz, the control/communication unit 370 generates the control signal to control the switching pulse signal generator 310 to set the frequency of the switching pulse signal to 13.56 MHz or 6.78 MHz. The switching pulse signal generator 310 includes, for example, a plurality of capacitors and a switch (not shown). The switching pulse signal generator 310 may adjust the frequency of the switching pulse signal by switching the plurality of capacitors in response to the control signal generated by the control/communication unit 370.

The power amplifier 320 switches a power control voltage supplied from a battery module or an AC/DC converter (not illustrated, but like the battery module 240 and the AC/DC converter 210 in FIG. 2) based on the switching pulse signal output from the switching pulse signal generator 310 to generate an AC supply power. For example, the power amplifier 320 may generate a tracking power, a charging power, or an operation power by switching the power control voltage based on the switching pulse signal.

The impedance controller 330 adjusts an impedance of the source resonator in response to the control signal generated by the control/communication unit 370.

Figure 4:
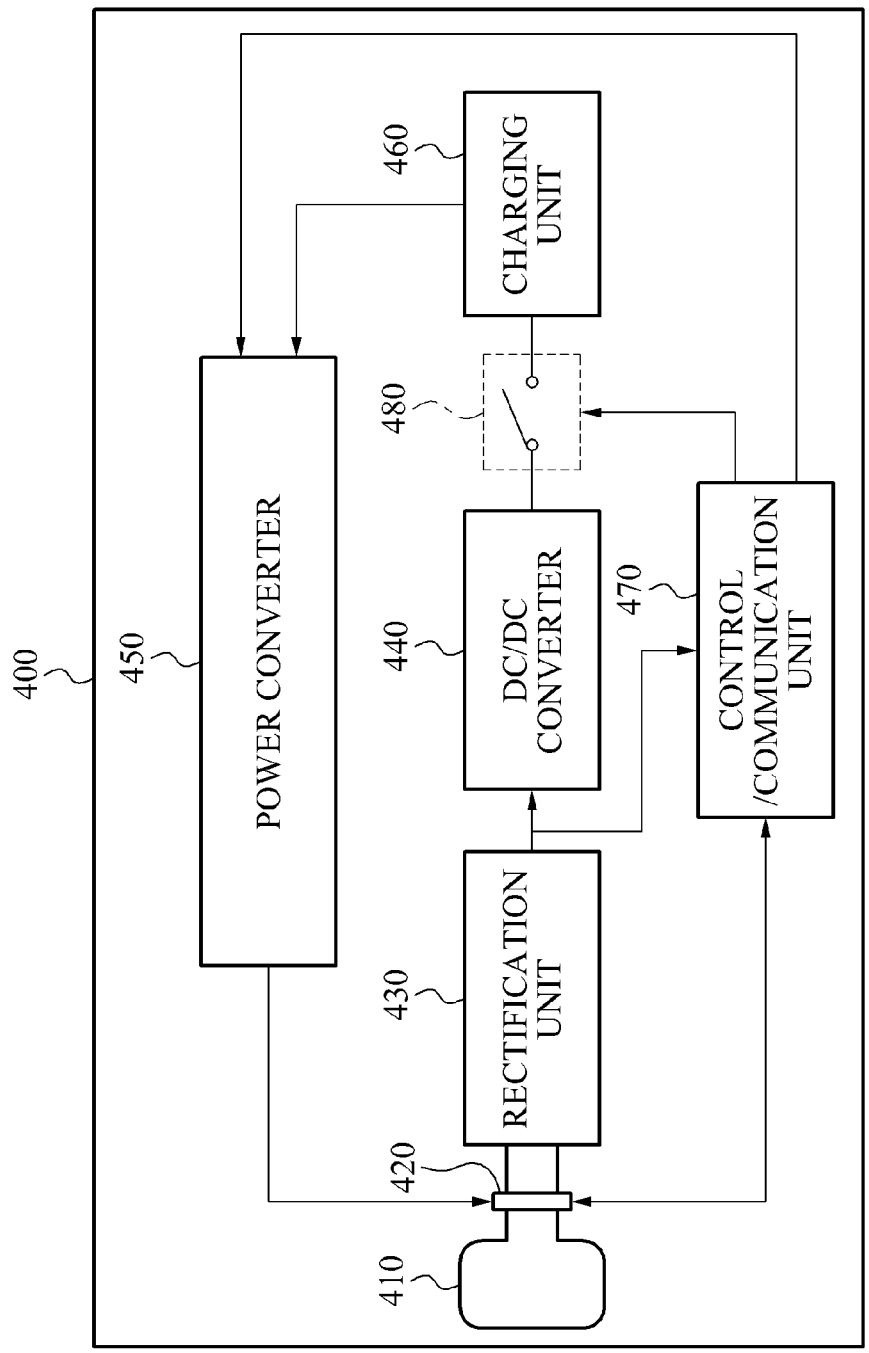
FIG. 4 is a diagram illustrating an example of a wireless power transceiver.

FIG. 4 is a diagram illustrating an example of a wireless power transceiver. A wireless power transceiver 400 of FIG. 4 may function as a source device configured to transmit wireless power, or a target device configured to receive wireless power. Referring to FIG. 4, the wireless power transceiver 400 includes a charging unit 460. The charging unit 460 includes a solar cell module (not shown, but like the solar cell module 220 in FIG. 2). For example, the charging unit 460 may perform charging using power generated by the solar cell module.

The wireless power transceiver 400 further includes a resonator 410, a path controller 420, a rectification unit 430, a DC/DC converter 440, a power converter 450, a control/communication unit 470, and a switch unit 480.

The resonator 410 may function as a target resonator configured to receive power from a wireless power transmitter via magnetic coupling, or a source resonator configured to transmit power to a wireless power receiver via magnetic coupling, depending on an operation mode of the wireless power transceiver 400. When the wireless power transceiver 400 receives power from a source device (not illustrated), the resonator 410 may be referred to as a target resonator. When the wireless power transceiver 400 transmits power to a target device (not illustrated), the resonator 410 may be referred to as a source resonator.

When the wireless power transceiver 400 is operated in a power transmission mode, the power converter 450 generates power by converting a DC voltage supplied to a power amplifier (not illustrated in FIG. 4, but like the power amplifier 320 in FIG. 3) to an AC voltage using a resonant frequency, and outputs the generated power to the resonator 410. In the example in FIG. 4, the charging unit 460 supplies the DC voltage to the power amplifier.

When the wireless power transceiver 400 is operated in a power reception mode, the rectification unit 430 generates a DC voltage by rectifying an AC signal of power received via the resonator 410.

The DC/DC converter 440 adjusts a level of the DC voltage generated by the rectification unit 430, and outputs a DC voltage having a predetermined level or an adjustable level to supply a load. In the example in FIG. 4, the load is the charging unit 460.

The path controller 420 controls connections between the resonator 410, the power converter 450, and the rectification unit 430 based on the operation mode of the wireless power transceiver 400.

The switch unit 480 performs the same function as the switch unit 124 of FIG. 1.

The control/communication unit 470 performs both the function of the control/communication unit 115 of FIG. 1 and the function of the control/communication unit 126 of FIG. 1. When the wireless power transceiver 400 is operated in the power transmission mode, the control/communication unit 470 performs the function of the control/communication unit 115. When the wireless power transceiver 400 is operated in the power reception mode, the control/communication unit 470 performs the function of the control/communication unit 126.

Figure 5:
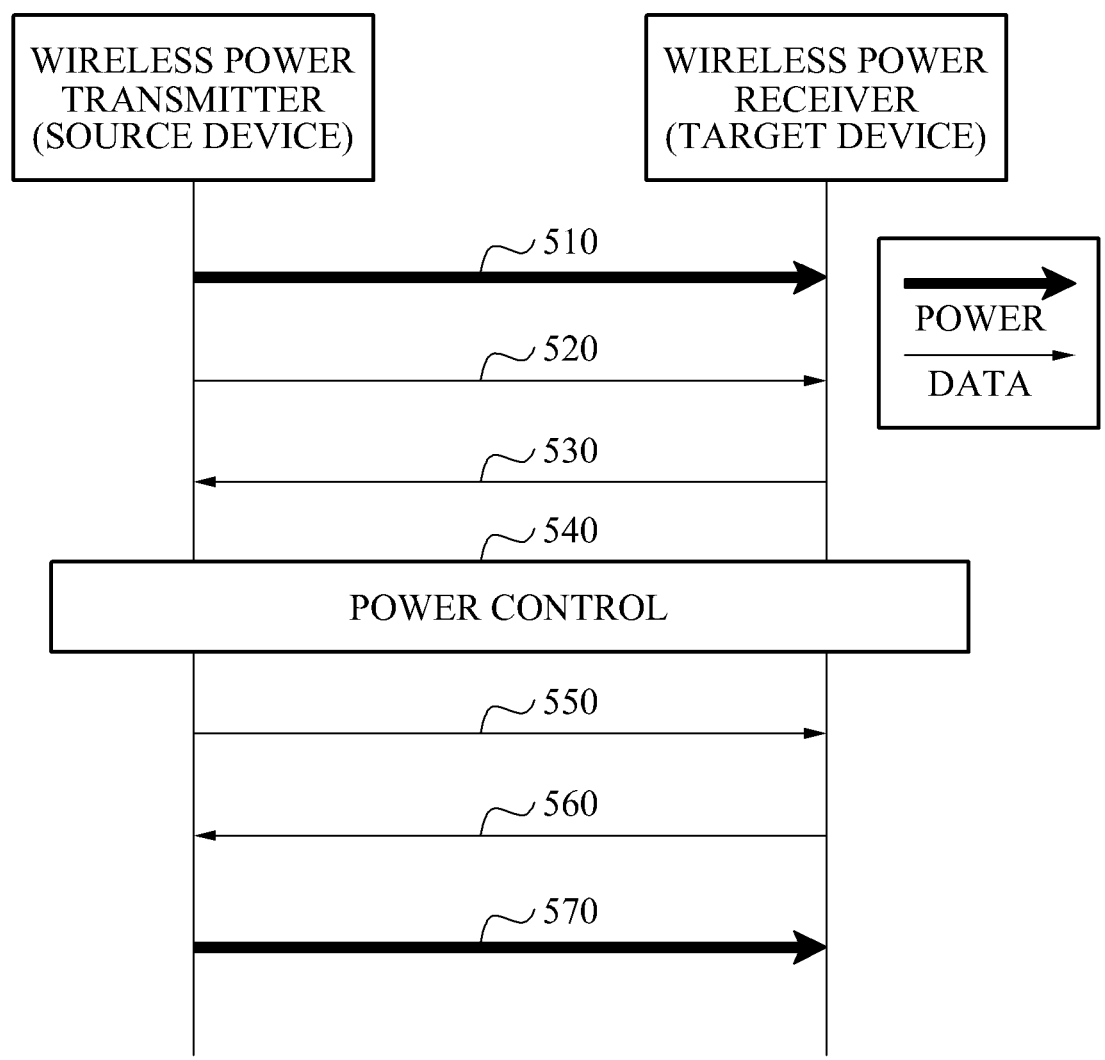
FIG. 5 is a diagram illustrating an example of a wireless power transmission method.

FIG. 5 is a diagram illustrating an example of a wireless power transmission method. Referring to FIG. 5, in 510, a wireless power transmitter, which is a source device, transmits a supply power to a wireless power receiver, which is a target device, via magnetic coupling. Prior to transmitting the supply power to the target device, the source device may charge a battery module using power generated by a solar cell module, and may generate the supply power using power stored in the battery module through the charging.

In 520, the source device requests state information of the target device. In 530, the source device receives the state information of the target device. The state information of the target device may include information on a dissipation power of the target device, or information on a battery type of the target device, or information on a battery charging state of the target device, or any combination thereof.

In 540, the source device controls an amount of the supply power based on the state information of the target device. For example, the source device may perform power control in 540.

When the dissipation power of the target device is greater than an amount of power that can be output by the battery module, the source device receives power supplied from an external device, and generates the supply power using the received power.

The source device may determine a battery charging state of a battery module of the target device. When the battery charging state indicates that the battery module of the target device is charged above a predetermined level, the source device may block power transmission to the target device.

Additionally, the source device may determine an amount of energy remaining in the battery module of the source device. For example, when the amount of the remaining energy is less than a predetermined value, the source device blocks the power transmission to the target device.

In 550, the source device re-requests the state information of the target device. In 560, the source device re-receives the state information of the target device.

In 570, the source device continues to transmit power to the target device.

In the following description, the term "resonator" used in the discussion of FIGS. 6A through 8B refers to both a source resonator and a target resonator unless indicated otherwise.

Figure 6A:
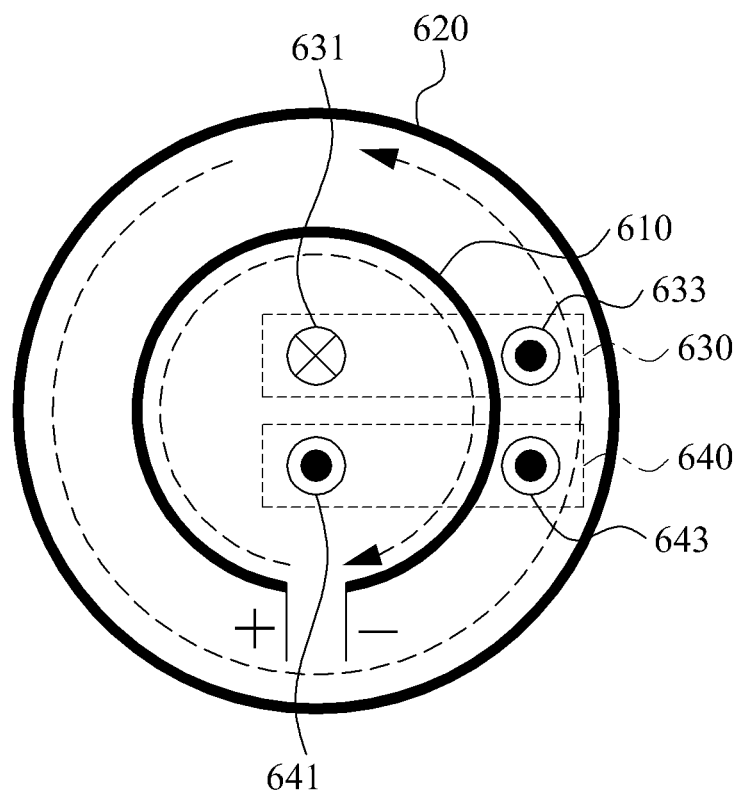
FIGS. 6A through 6B are diagrams illustrating examples of a distribution of a magnetic field in a feeder and a resonator of a wireless power transmitter.
Figure 6B:
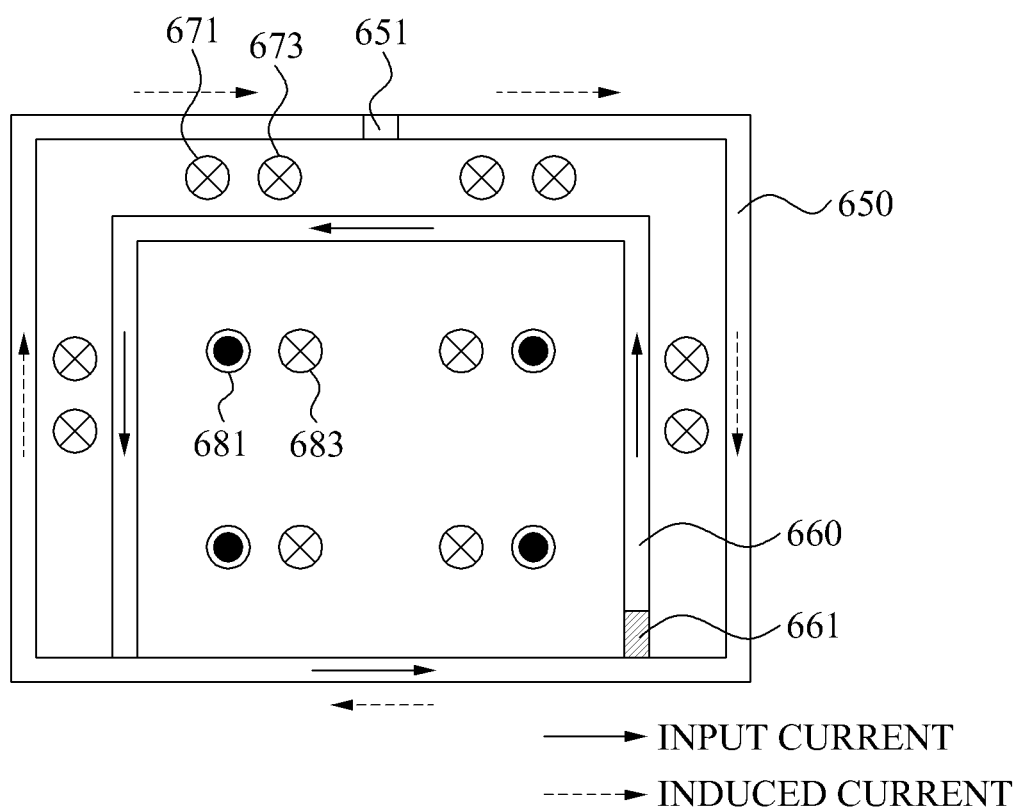

FIGS. 6A and 6B are diagrams illustrating examples of a distribution of a magnetic field in a feeder and a resonator of a wireless power transmitter. When a resonator receives power supplied through a separate feeder, magnetic fields are formed in both the feeder and the resonator.

FIG. 6A illustrates an example of a structure of a wireless power transmitter in which a feeder 610 and a resonator 620 do not have a common ground. Referring to FIG. 6A, as an input current flows into a feeder 610 through a terminal labeled "+" and out of the feeder 610 through a terminal labeled "-", a magnetic field 630 is formed by the input current. A direction 631 of the magnetic field 630 inside the feeder 610 is into the plane of FIG. 6A, and has a phase that is opposite to a phase of a direction 633 of the magnetic field 630 outside the feeder 610, which is out of the plane of FIG. 6A. The magnetic field 630 formed by the feeder 610 induces a current to flow in a resonator 620. The direction of the induced current in the resonator 620 is opposite to a direction of the input current in the feeder 610 as indicated by the dashed lines with arrowheads in FIG. 6A.

The induced current in the resonator 620 forms a magnetic field 640. Directions of the magnetic field 640 are the same at all positions inside the resonator 620, and are out of the plane of FIG. 6A. Accordingly, a direction 641 of the magnetic field 640 formed by the resonator 620 inside the feeder 610 has the same phase as a direction 643 of the magnetic field 640 formed by the resonator 620 outside the feeder 610.

Consequently, when the magnetic field 630 formed by the feeder 610 and the magnetic field 640 formed by the resonator 620 are combined, the strength of the total magnetic field inside the resonator 620 decreases inside the feeder 610, but increases outside the feeder 610. In an example in which power is supplied to the resonator 620 through the feeder 610 configured as illustrated in FIG. 6A, the strength of the total magnetic field decreases in the center of the resonator 620, but increases outside the resonator 620. In another example in which a magnetic field is randomly distributed in the resonator 620, it is difficult to perform impedance matching since an input impedance will frequently vary. Additionally, when the strength of the total magnetic field increases, an efficiency of wireless power transmission increases. Conversely, when the strength of the total magnetic field decreases, the efficiency of wireless power transmission decreases.

FIG. 6B illustrates an example of a structure of a wireless power transmitter in which a resonator 650 and a feeder 660 have a common ground. The resonator 650 includes a capacitor 651. The feeder 660 receives a radio frequency (RF) signal via a port 661. When the RF signal is input to the feeder 660, an input current is generated in the feeder 660. The input current flowing in the feeder 660 forms a magnetic field, and a current is induced in the resonator 650 by the magnetic field. Additionally, another magnetic field is formed by the induced current flowing in the resonator 650. In this example, a direction of the input current flowing in the feeder 660 has a phase opposite to a phase of a direction of the induced current flowing in the resonator 650. Accordingly, in a region between the resonator 650 and the feeder 660, a direction 671 of the magnetic field formed by the input current has the same phase as a direction 673 of the magnetic field formed by the induced current, and thus the strength of the total magnetic field increases in the region between the resonator 650 and the feeder 660. Conversely, inside the feeder 660, a direction 681 of the magnetic field formed by the input current has a phase opposite to a phase of a direction 683 of the magnetic field formed by the induced current, and thus the strength of the total magnetic field decreases inside the feeder 660. Therefore, the strength of the total magnetic field decreases in the center of the resonator 650, but increases outside the resonator 650.

Figure 7A:
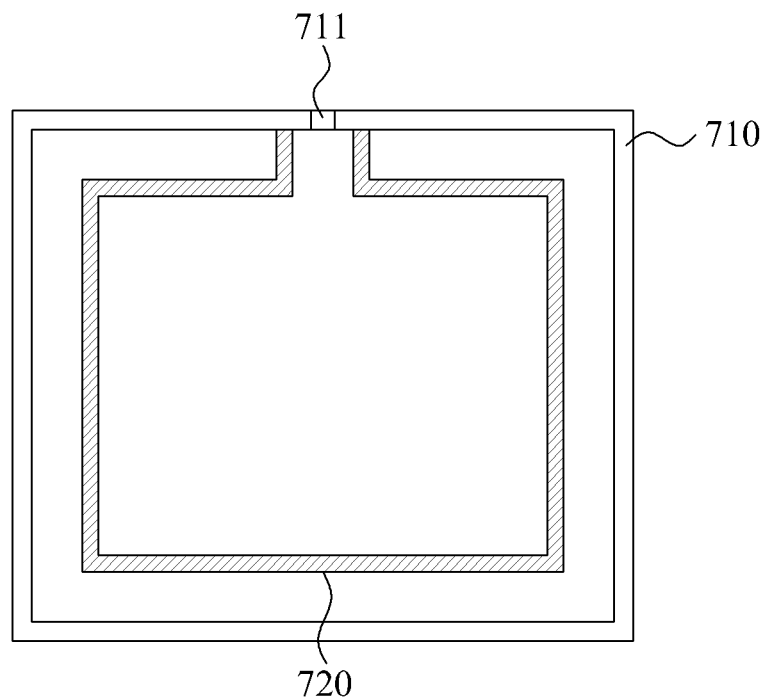
FIGS. 7A and 7B are diagrams illustrating an example of a wireless power transmitter including a resonator and a feeding unit.
Figure 7B:
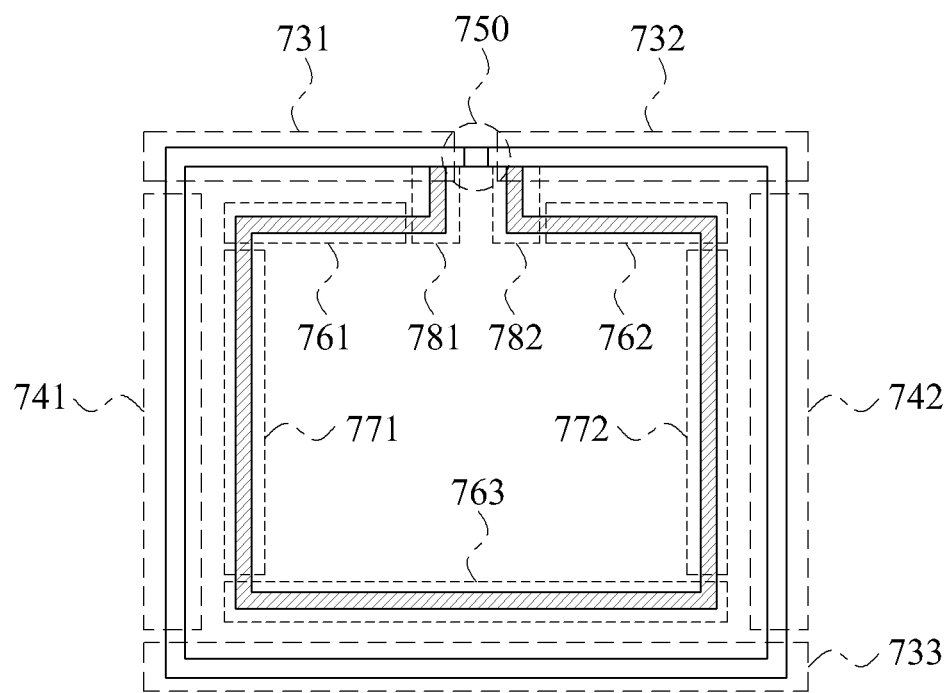

FIGS. 7A and 7B are diagrams illustrating an example of a wireless power transmitter including a resonator and a feeding unit. Referring to FIG. 7A, the wireless power transmitter includes a resonator 710 and a feeding unit 720. The resonator 710 includes a capacitor 711. The feeding unit 720 is electrically connected to both ends of the capacitor 711.

FIG. 7B is a diagram illustrating in greater detail a structure of the wireless power transmitter of FIG. 7A. The resonator 710 includes a first transmission line (not identified by a reference numeral in FIG. 7B, but formed by various elements in FIG. 7B as discussed below), a first conductor 741, a second conductor 742, and at least one capacitor 750.

The capacitor 750 is inserted in series between a first signal conducting portion 731 and a second signal conducting portion 732, causing an electric field to be confined concentrated in the capacitor 750. Generally, a transmission line includes at least one conductor in an upper portion of the transmission line, and at least one conductor in a lower portion of the transmission line. A current may flow through the at least one conductor disposed in the upper portion of the transmission line, and the at least one conductor disposed in the lower portion of the transmission line may be electrically grounded. In this example, a conductor disposed in an upper portion of the first transmission line in FIG. 7B is separated into two portions that will be referred to as the first signal conducting portion 731 and the second signal conducting portion 732. A conductor disposed in a lower portion of the first transmission line in FIG. 7B will be referred to as a first ground conducting portion 733.

As illustrated in FIG. 7B, the resonator 710 has a generally two-dimensional (2D) structure. The first transmission line includes the first signal conducting portion 731 and the second signal conducting portion 732 in the upper portion of the first transmission line, and includes the first ground conducting portion 733 in the lower portion of the first transmission line. The first signal conducting portion 731 and the second signal conducting portion 732 are disposed to face the first ground conducting portion 733. A current flows through the first signal conducting portion 731 and the second signal conducting portion 732.

One end of the first signal conducting portion 731 is connected to one end of the first conductor 741, the other end of the first signal conducting portion 731 is connected to one end of the capacitor 750, and the other end of the first conductor 741 is connected to one end of the first ground conducting portion 733. One end of the second signal conducting portion 732 is connected to one end of the second conductor 742, the other end of the second signal conducting portion 732 is connected to the other end of the capacitor 750, and the other end of the second conductor 742 is connected to the other end of the first signal conducting portion 733. Accordingly, the first signal conducting portion 731, the second signal conducting portion 732, the first ground conducting portion 733, the first conductor 741, and the second conductor 742 are connected to each other, causing the resonator 710 to have an electrically closed loop structure. The term "loop structure" includes a polygonal structure, a circular structure, a rectangular structure, and any other geometrical structure that is closed, i.e., that does not have any opening in its perimeter. The term "having a loop structure" indicates a structure that is electrically closed.

The capacitor 750 is inserted into an intermediate portion of the first transmission line. In the example in FIG. 7B, the capacitor 750 is inserted into a space between the first signal conducting portion 731 and the second signal conducting portion 732. The capacitor 750 may be a lumped element capacitor, a distributed element capacitor, or any other type of capacitor known to one of ordinary skill in the art.

The capacitor 750 inserted into the first transmission line may cause the resonator 710 to have a characteristic of a metamaterial. A metamaterial is a material having a predetermined electrical property that is not found in nature, and thus may have an artificially designed structure. All materials existing in nature have a magnetic permeability an a permittivity. Most materials have a positive magnetic permeability and/or a positive permittivity.

For most materials, a right-hand rule may be applied to an electric field, a magnetic field, and a Poynting vector of the materials, so the materials may be referred to as right-handed materials (RHMs). However, a metamaterial that has a magnetic permeability and/or a permittivity that is not found in nature may be classified into an epsilon negative (ENG) material, a mu negative (MNG) material, a double negative (DNG) material, a negative refractive index (NRI) material, a left-handed (LH) material, and any other metamaterial classification known to one of ordinary skill in the art based on a sign of the magnetic permeability of the metamaterial and a sign of the permittivity of the metamaterial.

If the capacitor 750 is a lumped element capacitor and a capacitance of the capacitor 750 is appropriately determined, the resonator 710 may have a characteristic of a metamaterial. If the resonator 710 is caused to have a negative magnetic permeability by appropriately adjusting the capacitance of the capacitor 750, the resonator 710 may also be referred to as an MNG resonator. Various criteria may be applied to determine the capacitance of the capacitor 750. For example, the various criteria may include a criterion for enabling the resonator 710 to have the characteristic of the metamaterial, a criterion for enabling the resonator 710 to have a negative magnetic permeability at a target frequency, a criterion for enabling the resonator 710 to have a zeroth order resonance characteristic at the target frequency, and any other suitable criterion. Based on any one or any combination of the aforementioned criteria, the capacitance of the capacitor 750 may be determined.

The resonator 710, hereinafter referred to as the MNG resonator 710, may have a zeroth order resonance characteristic of having a resonant frequency when a propagation constant is "0". If the resonator 710 has the zeroth order resonance characteristic, the resonant frequency is independent of a physical size of the MNG resonator 710. By changing the capacitance of the capacitor 750, the resonant frequency of the MNG resonator 710 may be changed without changing the physical size of the MNG resonator 710.

In a near field, the electric field is concentrated in the capacitor 750 inserted into the first transmission line, causing the magnetic field to become dominant in the near field. The MNG resonator 710 has a relatively high Q-factor when the capacitor 750 is a lumped element capacitor, thereby increasing a power transmission efficiency. The Q-factor indicates a level of an ohmic loss or a ratio of a reactance with respect to a resistance in the wireless power transmission. As will be understood by one of ordinary skill in the art, the efficiency of the wireless power transmission will increase as the Q-factor increases.

Although not illustrated in FIG. 7B, a magnetic core passing through the MNG resonator 710 may be provided to increase a power transmission distance.

Referring to FIG. 7B, the feeding unit 720 includes a second transmission line (not identified by a reference numeral in FIG. 7B, but formed by various elements in FIG. 7B as discussed below), a third conductor 771, a fourth conductor 772, a fifth conductor 781, and a sixth conductor 782.

The second transmission line includes a third signal conducting portion 761 and a fourth signal conducting portion 762 in an upper portion of the second transmission line, and includes a second ground conducting portion 763 in a lower portion of the second transmission line. The third signal conducting portion 761 and the fourth signal conducting portion 762 are disposed to face the second ground conducting portion 763. A current flows through the third signal conducting portion 761 and the fourth signal conducting portion 762.

One end of the third signal conducting portion 761 is connected to one end of the third conductor 771, the other end of the third signal conducting portion 761 is connected to one end of the fifth conductor 781, and the other end of the third conductor 771 is connected to one end of the second ground conducting portion 763. One end of the fourth signal conducting portion 762 is connected to one end of the fourth conductor 772, the other end of the fourth signal conducting portion 762 is connected to one end of the sixth conductor 782, and the other end of the fourth conductor 772 is connected to the other end of the second ground conducting portion 763. The other end of the fifth conductor 781 is connected to the first signal conducting portion 731 at or near where the first signal conducting portion 731 is connected to one end of the capacitor 750, and the other end of the sixth conductor 782 is connected to the second signal conducting portion 732 at or near where the second signal conducting portion 732 is connected to the other end of the capacitor 750. Thus, the fifth conductor 781 and the sixth conductor 782 are connected in parallel to both ends of the capacitor 750. The fifth conductor 781 and the sixth conductor 782 may be used as an input port to receive an RF signal as an input.

Accordingly, the third signal conducting portion 761, the fourth signal conducting portion 762, the second ground conducting portion 763, the third conductor 771, the fourth conductor 772, the fifth conductor 781, the sixth conductor 782, and the resonator 710 are connected to each other, causing the resonator 710 and the feeding unit 720 to have an electrically closed loop structure. The term "loop structure" includes a polygonal structure, a circular structure, a rectangular structure, and any other geometrical structure that is closed, i.e., that does not have any opening in its perimeter. The expression "having a loop structure" indicates a structure that is electrically closed.

If an RF signal is input to the fifth conductor 781 or the sixth conductor 782, input current flows through the feeding unit 720 and the resonator 710, generating a magnetic field that induces a current in the resonator 710. A direction of the input current flowing through the feeding unit 720 is identical to a direction of the induced current flowing through the resonator 710, thereby causing the strength of the total magnetic field to increase in the center of the resonator 710, and decrease near the outer periphery of the resonator 710.

An input impedance is determined by an area of a region between the resonator 710 and the feeding unit 720. Accordingly, a separate matching network used to match the input impedance to an output impedance of a power amplifier may not be necessary. However, if a matching network is used, the input impedance may be adjusted by adjusting a size of the feeding unit 720, and accordingly a structure of the matching network may be simplified. The simplified structure of the matching network reduces a matching loss of the matching network.

The second transmission line, the third conductor 771, the fourth conductor 772, the fifth conductor 781, and the sixth conductor 782 of the feeding unit 720 may have a structure identical to a structure of the resonator 710. For example, if the resonator 710 has a loop structure, the feeding unit 720 may also have a loop structure. As another example, if the resonator 710 has a circular structure, the feeding unit 720 may also have a circular structure.

FIG. 8A is a diagram illustrating an example of a distribution of a magnetic field inside a resonator produced by feeding of a feeding unit. FIG. 8A more simply illustrates the resonator 710 and the feeding unit 720 of FIGS. 7A and 7B, and the names of the various elements in FIG. 7B will be used in the following description of FIG. 8A without reference numerals.

A feeding operation may be an operation of supplying power to a source resonator in wireless power transmission, or an operation of supplying AC power to a rectification unit in wireless power transmission. FIG. 8A illustrates a direction of an input current flowing in the feeding unit, and a direction of an induced current flowing in the source resonator. Additionally, FIG. 8A illustrates a direction of a magnetic field formed by the input current of the feeding unit, and a direction of a magnetic field formed by the induced current of the source resonator.

Referring to FIG. 8A, the fifth conductor or the sixth conductor of the feeding unit may be used as an input port 810. In FIG. 8A, the sixth conductor of the feeding unit is being used as the input port 810. An RF signal is input to the input port 810. The RF signal may be output from a power amplifier. The power amplifier may increase and decrease an amplitude of the RF signal based on a power requirement of a target device. The RF signal input to the input port 810 is represented in FIG. 8A as an input current flowing in the feeding unit. The input current flows in a clockwise direction in the feeding unit along the second transmission line of the feeding unit. The fifth conductor and the sixth conductor of the feeding unit are electrically connected to the resonator. More specifically, the fifth conductor of the feeding unit is connected to the first signal conducting portion of the resonator, and the sixth conductor of the feeding unit is connected to the second signal conducting portion of the resonator. Accordingly, the input current flows in both the resonator and the feeding unit. The input current flows in a counterclockwise direction in the resonator along the first transmission line of the resonator. The input current flowing in the resonator generates a magnetic field, and the magnetic field induces a current in the resonator. The induced current flows in a clockwise direction in the resonator along the first transmission line of the resonator. The induced current in the resonator transfers energy to the capacitor of the resonator, and also generates a magnetic field. In FIG. 8A, the input current flowing in the feeding unit and the resonator is indicated by solid lines with arrowheads, and the induced current flowing in the resonator is indicated by dashed lines with arrowheads.

A direction of a magnetic field formed generated by a current is determined based on the right-hand rule. As illustrated in FIG. 8A, inside the feeding unit, a direction 821 of the magnetic field generated by the input current flowing in the feeding unit is identical to a direction 823 of the magnetic field generated by the induced current flowing in the resonator. Accordingly, the strength of the total magnetic field increases inside the feeding unit.

In contrast, as illustrated in FIG. 8A, in a region between the feeding unit and the resonator, a direction 833 of the magnetic field generated by the input current flowing in the feeding unit is opposite to a direction 831 of the magnetic field generated by the induced current flowing in the resonator. Accordingly, the strength of the total magnetic field decreases in the region between the feeding unit and the resonator.

Typically, in a resonator having a loop structure, a strength of a magnetic field decreases in the center of the resonator, and increases near an outer periphery of the resonator. However, referring to FIG. 8A, since the feeding unit is electrically connected to both ends of the capacitor of the resonator, the directly of the induced current in the resonator is identical to the direction of the input current in the feeding unit. Since the direction of the induced current in the resonator is identical to the direction of the input current in the feeding unit, the strength of the total magnetic field increases inside the feeding unit, and decreases outside the feeding unit. As a result, due to the feeding unit, the strength of the total magnetic field increases in the center of the resonator having the loop structure, and decreases near an outer periphery of the resonator, thereby compensating for the normal characteristic of the resonator having the loop structure in which the strength of the magnetic field decreases in the center of the resonator, and increases near the outer periphery of the resonator. Thus, the strength of the total magnetic field may be constant inside the resonator.

A power transmission efficiency for transferring wireless power from a source resonator to a target resonator is proportional to the strength of the total magnetic field generated in the source resonator. Accordingly, when the strength of the total magnetic field increases inside the source resonator, the power transmission efficiency also increases.

Figure 8B:
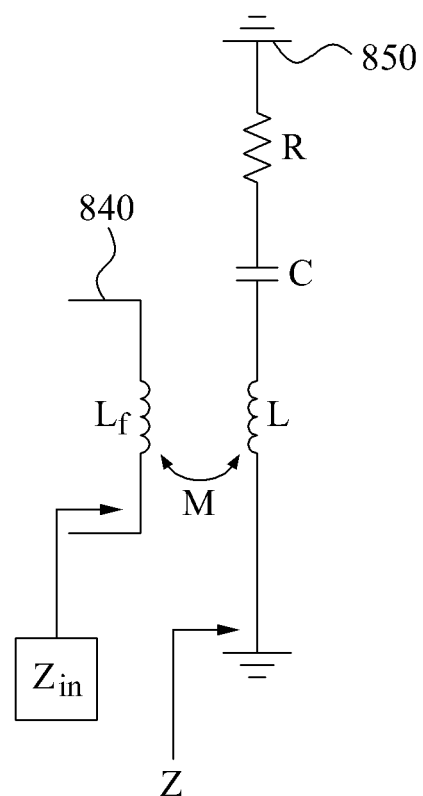
FIG. 8B is a diagram illustrating examples of equivalent circuits of a feeding unit and a resonator.

FIG. 8B is a diagram illustrating examples of equivalent circuits of a feeding unit and a resonator. Referring to FIG. 8B, a feeding unit 840 and a resonator 850 may be represented by the equivalent circuits in FIG. 8B. The feeding unit 840 is represented as an inductor having an inductance $L_f$, and the resonator 850 is represented as a series connection of an inductor having an inductance L coupled to the inductance $L_f$ of the feeding unit 840 by a mutual inductance M, a capacitor having a capacitance C, and a resistor having a resistance R. An example of an input impedance $Z_{in}$ viewed in a direction from the feeding unit 840 to the resonator 850 may be expressed by the following Equation 1:

$$Z_{in} = \frac{(\omega M)^2}{Z} \quad (1)$$

In Equation 1, M denotes a mutual inductance between the feeding unit 840 and the resonator 850, ω denotes a resonant frequency of the feeding unit 840 and the resonator 850, and Z denotes an impedance viewed in a direction from the resonator 850 to a target device. As can be seen from Equation 1, the input impedance $Z_{in}$ is proportional to the square of the mutual inductance M. Accordingly, the input impedance $Z_{in}$ may be adjusted by adjusting the mutual inductance M. The mutual inductance M depends on an area of a region between the feeding unit 840 and the resonator 850. The area of the region between the feeding unit 840 and the resonator 850 may be adjusted by adjusting a size of the feeding unit 840, thereby adjusting the mutual inductance M and the input impedance $Z_{in}$. Since the input impedance $Z_{in}$ may be adjusted by adjusting the size of the feeding unit 840, it may be unnecessary to use a separate matching network to perform impedance matching with an output impedance of a power amplifier.

In a target resonator and a feeding unit included in a wireless power receiver, a magnetic field may be distributed as illustrated in FIG. 8A. For example, the target resonator may receive wireless power from a source resonator via magnetic coupling. The received wireless power induces a current in the target resonator. The induced current in the target resonator generates a magnetic field, which induces a current in the feeding unit. If the target resonator is connected to the feeding unit as illustrated in FIG. 8A, a direction of the induced current flowing in the target resonator will be identical to a direction of the induced current flowing in the feeding unit. Accordingly, for the reasons discussed above in connection with 8A, the strength of the total magnetic field will increase inside the feeding unit, and will decrease in a region between the feeding unit and the target resonator.

The control/communication unit 115, the control/communication unit 126, the charging and path controller 230, the control/communication unit 270, the control/communication unit 370, the path controller 420, and the control/communication unit 470 described above may be implemented using one or more hardware components, one or more software components, or a combination of one or more hardware components and one or more software components.

A hardware component may be, for example, a physical device that physically performs one or more operations, but is not limited thereto. Examples of hardware components include power supplies, AC/DC converters, power detectors, power converters, resonators, rectification units, DC/DC converters, switch units, device loads, solar cell modules, battery modules, switching pulse signal generators, power amplifiers, impedance controllers, charging units, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the following claims and their equivalents are to be construed as being included in the disclosure.

What is claimed is:

1. A wireless power transmitter comprising:
    a charging and path controller configured to supply, to a battery module, power generated by a solar cell module, or power generated by an alternating current-to-direct current (AC/DC) converter, based on a control signal;
    a power converter configured to receive power from the battery module and generate a supply power to be supplied to a target device from the power received from the battery module using a resonant frequency;
    a source resonator configured to receive the supply power from the power converter and transmit the supply power received from the power converter to the target device; and
    a control/communication unit configured to generate the control signal of the charging and path controller based on an amount of the power generated by the solar cell and an amount of power that can be output by the battery module.

2. The wireless power transmitter of claim 1, wherein the AC/DC converter is configured to receive an AC voltage from an external power supply located outside the wireless power transmitter, convert the AC voltage received from the external power supply to a DC voltage, and output the DC voltage as the power generated by the AC/DC converter.

3. The wireless power transmitter of claim 1, wherein the power converter comprises:
    a switching pulse signal generator configured to generate a switching pulse signal having a same frequency as the resonant frequency;
    a power amplifier configured to switch a power control voltage supplied from the battery module based on the switching pulse signal to generate the supply power; and
    an impedance controller configured to adjust an impedance of the source resonator.

4. The wireless power transmitter of claim 1, wherein the control/communication unit is further configured to generate the control signal to control the charging and path controller to supply the power generated by the AC/DC converter to the battery module when the amount of the power generated by the solar cell module is less than a predetermined value.

5. The wireless power transmitter of claim 1, wherein the control/communication unit is further configured to generate the control signal to control the charging and path controller to supply the power generated by the solar cell module to the battery module when the amount of the power generated by the solar cell module is equal to or greater than a predetermined value.

6. The wireless power transmitter of claim 1, wherein the control/communication unit is further configured to:
   determine a dissipation power of the target device; and
   generate the control signal to control the charging and path controller to supply the power generated by the AC/DC converter to the battery module when the amount of the power generated by the solar cell module is less than the dissipation power.

7. The wireless power transmitter of claim 1, wherein the charging and path controller is further configured to supply the power generated by the solar cell module or the power generated by the AC/DC converter to the battery module, or supply the power generated by the AC/DC converter to the power converter, based on the control signal; and
   the control/communication unit is further configured to:
   determine a dissipation power of the target device; and
   generate the control signal to control the charging and path controller to supply the power generated by the AC/DC converter to the power converter when the amount of the power that can be output by the battery module is less than the dissipation power.

8. A wireless power transmission method using a solar cell module, the wireless power transmission method comprising:
   charging a battery module using power generated by a solar cell module;
   generating a supply to be supplied to a target device using power stored in the battery module by the charging;
   transmitting the supply power to the target device via a magnetic coupling;
   requesting state information of the target device;
   receiving the state information of the target device; and
   controlling an amount of the supply power based on the state information of the target device.

9. The wireless power transmission method of claim 8, wherein the state information of the target device comprises information on a dissipation power of the target device, or information on a battery type of the target device, or information on a battery charging state of the target device, or any combination thereof.

10. The wireless power transmission method of claim 9, wherein the state information of the target device comprises the information on the dissipation power of the target device; and
   the wireless power transmission method further comprises:
   receiving power supplied from an external power supply; and
   generating the supply power using the power received from the external device when the dissipation power is greater than an amount of power that can be output by the battery module.

11. The wireless power transmission method of claim 9, wherein the state information of the target device comprises the information on the battery charging state of the target device; and
   the wireless power transmission method further comprises:
   determining a battery charging state of the target device based on the information on the battery charging state of the target device; and
   blocking a power transmission to the target device when the battery charging state of the target device indicates that a battery module of the target device is charged above a predetermined level.

12. The wireless power transmission method of claim 8, further comprising:
   determining an amount of energy remaining in the battery module; and
   blocking a power transmission to the target device when the amount of the energy remaining in the battery module is less than a predetermined value.

13. A wireless power transmitter comprising:
   a solar cell module configured to output DC power;
   an alternating current-to-direct current (AC/DC) converter configured to output DC power;
   a battery module configured to receive DC power, store the DC power received by the battery module, and output the DC power stored by the battery module;
   a power converter configured to receive DC power, convert the DC power received by the power converter to AC power to be transmitted to a target device, and output the AC power;
   a source resonator configured to receive the AC power from the power converter and transmit the AC power received from the power converter to the target device;
   a charging and path controller configured to receive the DC power from the solar cell module and the DC power from the AC/DC converter, and based on a control signal, supply the DC power received from the solar cell module to the battery module, or supply the DC power received from the AC/DC converter to the battery module, or supply the DC power received from the AC/DC converter to the power converter; and
   a control/communication unit configured to generate the control signal of the charging and path controller based on an amount of the DC power output by the solar cell module, and an amount of DC power that can be output by the battery module.

14. The wireless power transmitter of claim 13, wherein the control/communication unit is further configured to generate the control signal to control the charging and path controller to supply the DC power received from the AC/DC converter to the battery module when the amount of the DC power output by the solar cell module is less than a predetermined value.

15. The wireless power transmitter of claim 13, wherein the control/communication unit is further configured to generate the control signal to control the charging and path controller to supply the DC power received from the solar cell module to the battery module when the amount of the DC power output by the solar cell module is equal to or greater than a predetermined value.

16. The wireless power transmitter of claim 13, wherein the control/communication unit is further configured to generate the control signal to control the charging and path controller to supply the DC power received from the AC/DC converter to the battery module when the amount of the DC power output by the solar cell module is less than a dissipation power of the target device.

17. The wireless power transmitter of claim 13, wherein the charging and path controller is further configured to generate the control signal to control the charging and path controller to supply the DC power received from the AC/DC converter to the power converter when the amount of the DC power that can be output by the battery module is less than a dissipation power of the target device.

* * * * *